United States Patent
Kocher et al.

[11] Patent Number: 6,042,862
[45] Date of Patent: Mar. 28, 2000

[54] LIDDED PACKAGE HAVING A TAB TO FACILITATE PEELING

[75] Inventors: Patrick N. Kocher; Robin D. Owens, both of Greer, S.C.

[73] Assignee: Cryovac, Inc., Duncan, S.C.

[21] Appl. No.: 09/030,303

[22] Filed: Feb. 25, 1998

Related U.S. Application Data

[62] Division of application No. 08/814,671, Mar. 11, 1997, Pat. No. 5,779,050.

[51] Int. Cl.$^7$ .................................................. B65B 55/00
[52] U.S. Cl. ........................ 426/411; 426/413; 426/414; 426/415; 428/36.6; 428/347; 206/557; 206/497
[58] Field of Search .................................. 206/557, 497; 426/106, 112, 129, 410, 411, 413, 414, 415; 428/36.6, 36.7, 36.92, 347

[56] References Cited

U.S. PATENT DOCUMENTS

| | | | |
|---|---|---|---|
| 1,042,119 | 10/1912 | Kavanagh . | |
| 2,260,064 | 10/1941 | Stokes | 93/3 |
| 2,623,826 | 12/1952 | Grinstead | 99/174 |
| 2,814,381 | 11/1957 | Stevick | 206/45.34 |
| 2,925,346 | 2/1960 | Harper et al. | 99/174 |
| 3,019,573 | 2/1962 | Navikas | 53/27 |
| 3,074,798 | 1/1963 | Palmer | 99/174 |
| 3,360,382 | 12/1967 | Miller | 99/174 |
| 3,561,668 | 2/1971 | Bergstrom | 229/43 |
| 3,574,642 | 4/1971 | Weinke | 99/174 |
| 3,641,732 | 2/1972 | Fujio | 53/14 |
| 3,681,092 | 8/1972 | Titchenal et al. | 99/174 |
| 3,713,849 | 1/1973 | Grindrod et al. | 99/174 |
| 3,716,180 | 2/1973 | Bemiss et al. | 299/13 |
| 3,783,089 | 1/1974 | Hurst et al. | 161/166 |
| 3,808,394 | 4/1974 | Mominee et al. | 219/121 |
| 3,843,806 | 10/1974 | Kishpaugh et al. | 426/106 |
| 4,055,672 | 10/1977 | Hirsch et al. | 426/127 |
| 4,264,392 | 4/1981 | Watt | 156/272 |
| 4,438,850 | 3/1984 | Kahn | 206/634 |
| 4,522,835 | 6/1985 | Woodruff et al. | 426/264 |
| 4,590,078 | 5/1986 | Umina | 426/113 |
| 4,634,614 | 1/1987 | Holzner | 428/35 |
| 4,667,814 | 5/1987 | Wakamatsu et al. | 206/0.7 |
| 4,700,531 | 10/1987 | Hsu et al. | 53/412 |
| 4,840,271 | 6/1989 | Garwood | 206/213.1 |
| 4,842,875 | 6/1989 | Anderson | 426/118 |
| 4,847,148 | 7/1989 | Schirmer | 428/332 |
| 4,886,372 | 12/1989 | Greengrass et al. | 383/100 |
| 4,886,690 | 12/1989 | Davis et al. | 428/36.6 |
| 4,889,731 | 12/1989 | Williams, Jr. | 426/106 |
| 4,910,033 | 3/1990 | Bekele et al. | 426/129 |
| 5,045,331 | 9/1991 | Antoon, Jr. | 426/118 |
| 5,079,059 | 1/1992 | Wyslotsky | 428/43 |
| 5,132,151 | 7/1992 | Graney | 428/40 |
| 5,226,531 | 7/1993 | Garwood | 206/213.1 |
| 5,296,291 | 3/1994 | Mueller | 428/349 |
| 5,346,735 | 9/1994 | Logan et al. | 428/36.7 |
| 5,348,752 | 9/1994 | Gorlich | 426/129 |
| 5,402,622 | 4/1995 | Stockley, III et al. | 53/427 |
| 5,419,096 | 5/1995 | Gorlich | 53/432 |

(List continued on next page.)

FOREIGN PATENT DOCUMENTS

| | | |
|---|---|---|
| 0 261 930 | 9/1987 | European Pat. Off. . |
| 0 270 764 | 10/1987 | European Pat. Off. . |
| 0 698 563 A1 | 8/1995 | European Pat. Off. . |
| 0 721 899 A1 | 7/1996 | European Pat. Off. . |
| 2 323 594 | 9/1975 | France . |
| 2240234 | 3/1993 | Germany . |
| 2251 540 | 1/1991 | United Kingdom . |
| WO 87/02965 | 5/1987 | WIPO . |
| WO 96/39341 | 12/1996 | WIPO . |
| WO 97/466447 | 12/1997 | WIPO . |

*Primary Examiner*—Nina Bhat
*Attorney, Agent, or Firm*—Thomas C. Lagaly

[57] ABSTRACT

A package having a lid bonded to a support member with a heat-seal to enclose a product between the support member and lid. The lid is at least partially heat-shrinkable and has a first peripheral portion and a second peripheral portion, the first peripheral portion being heat-contracted toward the heat-seal to a greater degree relative to the second peripheral portion so that the second peripheral portion provides a tab which can be manually grasped for peeling the lid.

16 Claims, 6 Drawing Sheets

U.S. PATENT DOCUMENTS

| | | | |
|---|---|---|---|
| 5,419,097 | 5/1995 | Gorlich et al. | 53/432 |
| 5,439,132 | 8/1995 | Gorlich | 220/359 |
| 5,492,705 | 2/1996 | Porchia et al. | 426/106 |
| 5,518,790 | 5/1996 | Huber et al. | 428/35.2 |
| 5,560,182 | 10/1996 | Garwood | 53/432 |
| 5,591,468 | 1/1997 | Stockley, III et al. | 206/439 |
| 5,632,134 | 5/1997 | Noel et al. | 53/433 |
| 5,686,127 | 11/1997 | Stockley, III et al. | 426/129 |

LIDDED PACKAGE HAVING A TAB TO FACILITATE PEELING

This is a divisional of application Ser. No. 08/814,671, filed on Mar. 11, 1997, now U.S. Pat. No. 5,779,050.

BACKGROUND OF THE INVENTION

The present invention relates to packaging for products, such as fresh red meat or other food products, which are enclosed between a support member and a lid in such a manner that the lid can be peelably removed from the support member or peelably delaminated to alter the gas-permeability of the lid (thereby changing the environmental conditions within the package). More specifically, the invention relates to such packaging wherein the lid has a tab to facilitate the peeling thereof.

Various forms of packaging, particularly for food products, employ a relatively rigid support member, such as a flat sheet or tray, upon or in which a product is supported. A relatively flexible lid or cover is bonded to the support member around the product, generally by forming a heat-seal between the lid and support member, to thereby enclose the product between the lid and support member. Examples of this type of packaging include vacuum skin packaging and modified-atmosphere packaging. In vacuum skin packaging, the lid is thermoformable, i.e., capable of being formed into a desired shape upon the application of heat, and is thermoformed about the product on a support member by means of heat and differential pressure. Virtually all of the air is evacuated from the interior of the package so that the lid conforms very closely to the contour of the packaged product (see, e.g., U.S. Pat. Nos. Re 30,009 (Purdue et al.) and 5,346,735 (Logan et al.), the disclosures of which are hereby incorporated herein by reference). In modified-atmosphere packaging, a food product is generally packaged in a tray-like support member having a peripheral flange to which the lid is secured. Prior to securing the lid to the support member, air is generally evacuated from the interior of the support member and replaced by a gas which extends the shelf-life of the packaged product.

In these and similar types of packaging applications, both the lid and support member generally comprise materials which form a barrier to the passage of gas therethrough so that the package is, at least initially, substantially gas-impermeable. Eventually, the lid is either completely removed from the package by the consumer or a portion of the lid is removed by a retailer prior to placing the package in a display case for consumer purchase. The latter event occurs where it is desirable to increase the gas-permeability of the lid in order to allow air (oxygen) to come into contact with the packaged product while still providing protection to the product from, e.g., dirt, dust, moisture, microbial contaminates, etc. This is generally desirable where air-contact with the packaged product renders the product more appealing to the consumer in some way.

For example, while a low-oxygen packaging environment generally increases the shelf-life of a packaged fresh red meat product (relative to meat products packaged in an environment having a higher oxygen content), red meat has a tendency to assume a purple color when packaged in the absence of oxygen or in an environment having a very low oxygen concentration, i.e., below about 5% oxygen. Unfortunately, such a purple color is undesirable to most consumers, and marketing efforts to teach the consumer about the acceptability of the purple color have been largely ineffective. When meat is exposed to a sufficiently high concentration of oxygen, e.g., as found in air, it assumes a bright red color which most consumers associate with freshness. After 1 to 3 days of such exposure, however, meat assumes a brown color which, like the purple color, is undesirable to most consumers (and indicates that the meat is beginning to spoil). Thus, in order to effectively butcher and package fresh red meat products in a central facility for distribution to retail outlets, the meat is packaged, shipped, and stored in a low-oxygen (vacuum or modified-atmosphere) environment for extended shelf-life, and then displayed for consumer sale in a relatively high-oxygen environment such that the meat is caused to "bloom" into a red color just before being placed in a retail display case.

The foregoing may be accomplished by providing a lid which peelably delaminates into a gas-permeable portion and a substantially gas-impermeable portion, with the gas-permeable portion being bonded to the support member so that the gas-impermeable portion can be peelably removed from the package. In this manner, the package may be shipped with the upper, gas-impermeable portion secured to the lower, gas-permeable portion to maintain a low-oxygen environment within the package during shipping. Then, the gas-impermeable portion may be peelably removed at the supermarket just prior to placing the package in a retail display case. Since the remaining portion of the lid is permeable to gas (oxygen), it allows the meat product to bloom in the presence of oxygen which enters the package from the ambient atmosphere. This packaging concept is also applicable to poultry, which assumes a pink color in the presence of oxygen but has a longer shelf-life in a low-oxygen environment.

Regardless of whether the lid is completely removed or peelably delaminated, it is desirable that the lid have a tab which can be manually grasped to facilitate peeling. Such a peel tab would desirably be provided without necessitating additional process or packaging steps, materials (e.g., materials from which the tab would be formed), or expense. It would also be desirable for the lid having such a peel tab to result in an aesthically appealing package both prior to peeling and, in the case where the lid is delaminatable, after peelable delamination of the lid.

SUMMARY OF THE INVENTION

The foregoing desired features are met by the package, apparatus, and method of the present invention as will now be described.

In accordance with one aspect of the present invention, a package comprises:

a. a support member for supporting a product thereon; and b. a lid bonded to the support member with a heat-seal between the support member and the lid. The heat-seal extends substantially continuously about the product to enclose the product between the support member and the lid. The lid is at least partially heat-shrinkable and has a first peripheral portion and a second peripheral portion, the first peripheral portion being heat-contracted toward the heat-seal to a greater degree relative to the second peripheral portion, whereby the second peripheral portion provides a tab which can be manually grasped for peeling the lid.

In accordance with another aspect of the present invention, a packaging apparatus comprises:

a. a mechanism for positioning a web of film over a support member having a product thereon, the film being at least partially heat-shrinkable;

b. a device for securing a portion of the web to the support member by forming a heat-seal between the support member and the web, the heat-seal extending substantially continuously about the product to enclose the product between the support member and the secured portion of the web; and c. an apparatus for severing a segment of the web in a substantially closed geometrical shape that encompasses the secured portion of the web. The severing apparatus comprises a cutting element having a heated portion and a relatively cooler portion so that a first peripheral portion of the severed web segment adjacent the heated portion of the cutting element is heat-contracted toward the heat-seal to a greater degree relative to a second peripheral portion of the severed web segment adjacent the relatively cooler portion of the cutting element. In this fashion, the second peripheral portion of the severed web segment extends outwardly of the heat-seal to a greater degree than the first peripheral portion so that the resultant lid has a tab which can be manually grasped.

In accordance with yet another aspect of the invention, a packaging method comprises:

a. positioning a web of film over a support member having a product thereon, the film being at least partially heat-shrinkable;

b. securing a portion of the web to the support member by forming a heat-seal between the support member and the web, the heat-seal extending substantially continuously about the product to enclose the product between the support member and the secured portion of the web; and c. severing a segment of the web in a substantially closed geometrical shape that encompasses the secured portion of the web with a cutting element having a heated portion and a relatively cooler portion so that a first peripheral portion of the severed web segment adjacent the heated portion of the cutting element is heat-contracted toward the heat-seal to a greater degree relative to a second peripheral portion of the severed web segment adjacent the relatively cooler portion of the cutting element. In this manner, the second peripheral portion of the severed web segment extends outwardly of the heat-seal to a greater degree than the first peripheral portion so that the resultant lid has a tab which can be manually grasped.

In a preferred embodiment of the invention, the package is a modified-atmosphere package and the lid delaminates into a substantially gas-impermeable portion and a gas-permeable portion, with the gas-permeable portion being bonded directly to the support member of the package. The gas-impermeable portion may be peelably removed from the package by grasping and pulling the peel tab back across the package, thereby allowing atmospheric oxygen to enter the interior of the package via the remaining gas-permeable portion. In a particularly preferred embodiment, the gas-permeable portion is perforated and the lid delaminates within such perforated portion, thereby exposing the perforations to the ambient atmosphere to allow for rapid ingress of atmospheric oxygen into the interior of the package.

By thus providing a peel tab from the same material from which the lid is formed, i.e., from a less heat-contracted peripheral portion of the lid, no additional process or packaging steps are required to form the peel tab. Further, no additional materials or additional expenses are entailed. Advantageously, by heat-contracting a majority of the periphery of the lid towards the heat-seal bonding the lid to the support member, the resultant package can be made aesthically appealing, with only the peel tab extending an appreciable extent from the heat-seal. In case where the lid is delaminatable, the tab can be completely removed from the package along with the gas-impermeable portion of the lid so that the package which is displayed for consumer purchase contains no evidence of the peel tab and little or no film extending beyond the periphery of the support member, and thereby closely resembles a package as traditionally assembled in the retail facility (rather than at a central meat packaging facility) to provide the consumer with a package that has a familiar appearance.

Definitions

As used herein, the term "heat-seal" (also known as a "heat-weld") refers to the union of two films by bringing the films into contact, or at least close proximity, with one another and then applying sufficient heat and pressure to a predetermined area (or areas) of the films to cause the contacting surfaces of the films in the predetermined area to become molten and intermix with one another, thereby forming an essentially inseparable bond between the two films in the predetermined area when the heat and pressure are removed therefrom and the area is allowed to cool. Two or more heat-seals uniting three or more films may be formed simultaneously by bringing three or more films into contact and applying heat and pressure in a predetermined area as just described, thereby causing the contacting surfaces of the three or more films in the predetermined area to form two or more essentially inseparable bonds between the three or more films in the predetermined area. In accordance with the practice of the present invention, a heat-seal preferably creates a hermetic seal, i.e., a barrier to the outside atmosphere.

As used herein, the term "multilayer film" refers to a thermoplastic material, generally in sheet or web form, having one or more layers formed from polymeric or other materials which are bonded together by any conventional or suitable method, including but not limited to one or more of the following methods: coextrusion, extrusion coating, lamination, vapor deposition coating, solvent coating, emulsion coating, suspension coating, etc. Such methods are well known in the art. For example, "coextrusion," "coextrude," and the like refer to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes. As a further example, "lamination," "laminate," and the like refer to a multiple-film composite structure having two or more films which are bonded together by any suitable means, including adhesive bonding; reactive surface modification (e.g., corona treatment, flame treatment, or plasma treatment); heat treatment; pressure treatment; etc., including combinations thereof.

As used herein, the phrases "reactive surface modification," "reactively modifying the surface of," "reactively-modified surface," and the like refer to chemically altering the surface of a film in order to incorporate reactive species onto such film surface, e.g., to provide the film surface with auto-adhesion functionality (i.e., rendering the surface capable of adhering to another surface without the need for an adhesive). Specific examples of reactive surface modification include corona treatment, plasma (ionized gas) treatment, and flame treatment, with corona treatment being preferred. The surface of a film which has been subjected to reactive surface modification is referred to as a "modified surface" or, in the case of corona treatment, a "corona treated surface."

As used herein, the term "film" refers generally to a thermoplastic material, generally in sheet or web form, having one or more layers formed from polymeric or other materials. A film can be a monolayer film (having only one layer) or a multilayer film (having two or more layers).

As used herein, the term "layer" refers generally to a discrete film component which is coextensive with the film and has a substantially uniform composition. In a monolayer film, the "film" and "layer" would be one and the same.

As used herein, the terms "delaminate," "delamination," and the like refer generally to the internal separation of a multilayer film within a layer and/or at an inter-layer (i.e., layer/layer) or inter-film (film/film) interface within the multilayer film when such film is subjected to a peel force of sufficient magnitude. A laminate of two or more films in accordance with the present invention may include a coextruded film having an intra-film cohesive strength which is both lower than the inter-film bond-strengths between the component films of the laminate and also lower than the intra-film cohesive strengths of the other films in the laminate. In this manner, the coextruded film component of the laminate internally separates, i.e., delaminates, when the laminate is subjected to a peel force which exceeds the intra-film cohesive strength of the coextruded film.

As used herein, the term "intra-film cohesive strength" refers to the internal force with which a film remains intact, as measured in a direction that is perpendicular to the plane of the film. In a multilayer film, intra-film cohesive strength is provided both by inter-layer adhesion (the adhesive strength between the layers which binds them to one another) and by the intra-layer cohesion of each film layer (i.e., the cohesive strength of each of the film layers). In a monolayer film, intra-film cohesive strength is provided only by the intra-layer cohesion of the layer which constitutes the film.

As used herein, the terms "peel," "peeling," and the like refer generally to the act of removing one or more layers (and/or films) from a multilayer film by manually grasping and pulling back the layers along a plane or interface of relatively low bond-strength or within a layer having relatively weak intra-layer cohesion. Peeling may, for example, include the removal of one or more layers from a coextruded film in a multi-film laminate, along with one or more films which are attached to the layers removed from the coextruded film. Peeling may also include the complete removal of a multilayer film from a surface to which the film has been heat-sealed.

As used herein, the term "peelably sealed" refers to a lid, generally in the form of a thermoplastic film, which is heat-sealed to a support member in such a manner that the lid can subsequently be substantially completely removed from the support member by peeling the lid from the support member.

As used herein, the term "peel force" refers to the amount of force required to ply-separate two layers, and/or internally separate one layer, of a multilayer film, as measured in accordance with ASTM F904–91.

As used herein, the term "bond-strength" refers generally to the adhesive force with which two adjacent films, or two adjacent film layers, are connected, e.g., by coextrusion, lamination, or via a heat-seal, in accordance with ASTM F88–94.

As used herein, the phrase "gas-permeable" refers to a film or film portion which admits at least about 1,000 cc of gas, such as oxygen, per square meter of film per 24 hour period at 1 atmosphere and at a temperature of 73° F. (at 0% relative humidity). More preferably, a gas-permeable film or film portion admits at least 5,000, even more preferably at least 10,000, such as at least 15,000, 20,000, 25,000, 30,000, 35,000, 40,000, and 50,000, and most preferably at least 100,000 cc of oxygen per square meter per 24 hour period at 1 atmosphere and at a temperature of 73° F. (at 0% relative humidity). In accordance with the present invention, a gas-permeable film or film portion can itself have the aforedescribed levels of gas permeability or, alternatively, can be a film or film portion which does not inherently possess the aforedescribed levels of gas permeability but which is altered, e.g., perforated or peelably delaminated, to render the film gas-permeable as defined above.

As used herein, the phrase "substantially gas-impermeable" refers to a film or film portion which admits less than 1000 cc of gas, such as oxygen, per square meter of film per 24 hour period at 1 atmosphere and at a temperature of 73° F. (at 0% relative humidity). More preferably, a substantially gas-impermeable film admits less than about 500, such as less than 300, and less than 100 cc of gas; more preferably still less than about 50 cc, and most preferably less than 25 cc, such as less than 20, less than 15, and less than 10 cc of gas per square meter per 24 hour period at 1 atmosphere and at a temperature of 73° F. (at 0% relative humidity).

As used herein, the phrase "support member" refers to a component of a package on or in which a product is disposed. Meat products are typically disposed in a tray-like package component comprising, e.g., expanded (foamed) or non-foamed polystyrene sheet material which has been thermoformed into a desired shape, for supporting the meat product. A support member preferably includes a cavity into which the product is disposed and a peripheral flange which provides a sealing surface for attachment of a lid to the support member to thereby enclose the product within the cavity. A support member may also include a substantially flat, i.e., non-thermoformed, sheet which may be foamed or non-foamed.

As used herein, the phrase "ethylene/alpha-olefin copolymer" generally designates copolymers of ethylene with one or more comonomers selected from $C_3$ to $C_{20}$ alpha-olefins, such as 1-butene, 1-pentene, 1-hexene, 1-octene, methyl pentene and the like, in which the polymer molecules comprise long chains with relatively few side chain branches. These polymers are obtained by low pressure polymerization processes and the side branching which is present will be short compared to non-linear polyethylenes (e.g., LDPE, a low density polyethylene homopolymer). Ethylene/alpha-olefin copolymers generally have a density in the range of from about 0.86 g/cc to about 0.94 g/cc. The term linear low density polyethylene (LLDPE) is generally understood to include that group of ethylene/alpha-olefin copolymers which fall into the density range of about 0.915 to about 0.94 g/cc. Sometimes linear polyethylene in the density range from about 0.926 to about 0.94 is referred to as linear medium density polyethylene (LMDPE). Lower density ethylene/alpha-olefin copolymers may be referred to as very low density polyethylene (VLDPE, typically used to refer to the ethylene/butene copolymers available from Union Carbide with a density ranging from about 0.88 to about 0.91 g/cc) and ultra-low density polyethylene (ULDPE, typically used to refer to the ethylene/octene copolymers supplied by Dow).

The phrase "ethylene/alpha-olefin copolymer" also includes homogeneous polymers such as metallocene-catalyzed EXACT™ linear homogeneous ethylene/alpha-olefin copolymer resins obtainable from the Exxon Chemical Company, of Baytown, Tex.; TAFMER™ linear homogeneous ethylene/alpha-olefin copolymer resins obtainable from the Mitsui Petrochemical Corporation; and long-chain branched, metallocene-catalyzed homogeneous ethylene/alpha-olefin copolymers available from The Dow Chemical Company, known as AFFINITY™ resins. The phrase "homogeneous polymer" refers to polymerization reaction products of relatively narrow molecular weight distribution and relatively narrow composition distribution. Homogeneous polymers are structurally different from heterogeneous polymers (e.g., ULDPE, VLDPE, LLDPE, and LMDPE) in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysts, rather than using Ziegler-Natta catalysts. Such single-site catalysts typically have only one type of catalytic site, which is believed to be the basis for the homgeniety of the polymers resulting from the polymerization.

As used herein, the term "oriented" or "stretch-oriented" refers to a polymer-containing material which has been stretched at an elevated temperature (the orientation temperature), followed by being "set" in the stretched configuration by cooling the material while substantially retaining the stretched dimensions. A material can be stretched in one direction (uniaxial orientation), two directions (biaxial orientation), or multiple directions. Biaxial orientation typically occurs in two directions which are perpendicular to one another, such as the longitudinal direction and the transverse direction. Upon reheating, an oriented film will shrink in the direction of orientation.

As used herein, the terms "heat-shrinkable," "heat-shrink" and the like refer to the tendency of a film, generally an oriented film, to shrink upon the application of heat, i.e., to contract such that the size (area) of such film in an unrestrained state decreases or the tension of such film in a restrained state increases. As a corollary, the term "heat-contracted" refers to a heat-shrinkable film, or a portion thereof, which has been exposed to heat such that the film or film portion is in a heat-shrunken state, i.e., reduced in size (unrestrained) or under increased tension (restrained).

DETAILED DESCRIPTION OF THE INVENTION

Figure 1:
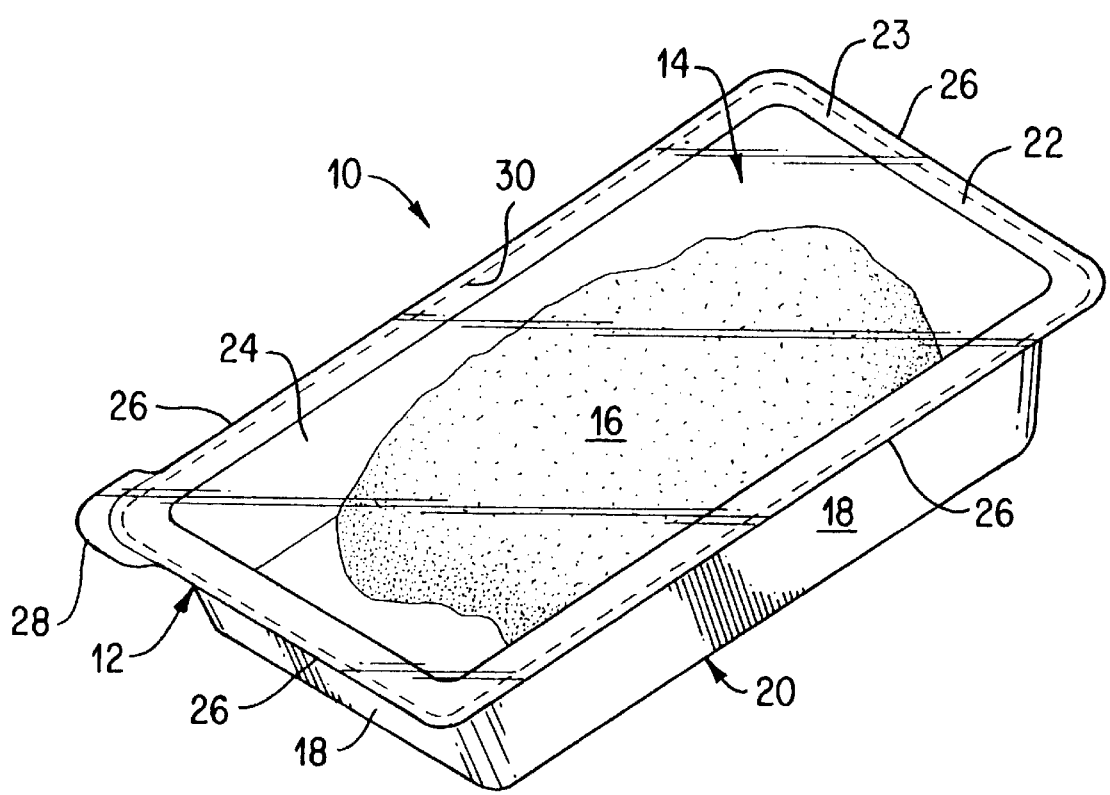
FIG. 1 is a perspective view of a package in accordance with the present invention, including a product support member with a product disposed therein and a lid heat-sealed to the support member to enclose the product between the support member and lid, the lid comprising a multilayer film heat-sealed to the support member and including a tab which can be manually grasped for peeling the lid.

FIG. 1 illustrates package 10 which, in accordance with present invention, includes product support member 12 having a cavity 14 formed therein and a product 16 disposed within the cavity. Support member 12 is preferably in the form of a tray having side walls 18 and a base 20 which define the cavity 14, and further includes a peripheral flange 22 extending outwardly from the cavity. A lid 24 is bonded to flange 22 to enclose product 16 between support member 12 and the lid. Preferably, lid 24 is bonded to flange 22 via heat-seal 30 (represented in phantom) which extends substantially continuously around the upper surface 23 of flange 22 to enclose product 16 within cavity 14 of package 10.

In general, any support member/heat-seal configuration may be employed so long as the heat-seal extends substantially continuously about the product to enclose the product between the lid and support member. For example, support member 12 can be a substantially flat sheet with product 16 disposed thereon and with heat-seal 30 forming a closed geometric pattern about the base of the product to form an enclosure therefor.

In accordance with the present invention, lid 24 is at least partially heat-shrinkable and has a first peripheral portion 26 and a second peripheral portion 28. First peripheral portion 26 is heat-contracted toward heat-seal 30 to a greater degree relative to second peripheral portion 28. In this manner, second peripheral portion 28 extends outwardly of heat-seal 30 to a greater degree than first peripheral portion 26 to thereby provide a tab which can be manually grasped for peeling lid 24. As illustrated in FIG. 1, second peripheral portion or tab 28 is positioned at a corner of flange 22. While this is a preferred position in terms of facilitating the peeling of lid 24, it is not a requirement. That is, tab 28 may be located at any desired position along the periphery of lid 24, e.g., at another corner or in between two corners. Further, tab 28 may have any desired shape or size. For example, instead of the bulbous shape illustrated in FIG. 1, tab 28 may have a more elongated or tapered shape.

As stated above, first peripheral portion 26 of lid 24 is heat-contracted toward heat-seal 30 to a greater degree relative to second peripheral portion 28. The relative difference between the degree or extent to which the two peripheral portions are heat-contracted toward heat-seal 30 determines the degree or extent to which tab 28 extends outwardly from the heat-seal relative to the first peripheral portion 26. This difference can be pre-selected as desired to suit the needs of the end-user (e.g., a retailer or consumer), i.e., to provide a peel tab having a desired shape and size.

Preferably, first peripheral portion 26 is heat-contracted toward heat-seal 30 to the greatest extent possible to provide a neat, aesthetically-pleasing package appearance. For this reason, the size of tab 28, i.e., its length along flange 22 and the extent to which it extends from heat-seal 30, is preferably minimized. The size of tab 28 is preferably only large enough to permit the tab to be grasped between the thumb and forefinger of an average person. A preferred method and apparatus for making a package in accordance with the present invention having a tab 28 is described below.

Lid 24 and support member 12 preferably form a substantially gas-impermeable enclosure for product 16 which substantially completely protects the product from contact with the surrounding environment including, in particular, atmospheric oxygen, but also including dirt, dust, moisture, microbial contaminates, etc., especially when product 16 is a food product. When product 16 is oxygen-sensitive, i.e., perishable, degradable, or otherwise changeable in the presence of oxygen, such as fresh red meat products (e.g., beef, veal, lamb, pork, etc.), poultry (chicken, turkey, etc.), fish, cheese, fruits, or vegetables, it is preferred that product 16 be packaged in a low-oxygen environment within package 10 to maximize the shelf-life of the product.

Support member 12 can have any desired configuration or shape, e.g., rectangular, round, oval, etc. Similarly, flange 22 may have any desired shape or design, including a simple, substantially flat design which presents a single sealing surface as shown, or a more elaborate design, e.g., one which presents two or more sealing surfaces, such as the flange configurations disclosed in U.S. Pat. Nos. 5,348,752 and 5,439,132, the disclosures of which are hereby incorporated herein by reference.

Suitable materials from which support member 12 can be formed include, without limitation, polyvinyl chloride, polyethylene terephthalate, polystyrene, polyolefins such as high density polyethylene or polypropylene, paper pulp, nylon, polyurethane, etc. The support member may be foamed (expanded) or non-foamed as desired, and preferably provides a barrier to the passage of oxygen therethrough, particularly when product 16 is a food product which is oxygen-sensitive. When such oxygen-sensitive products are to be packaged in a low-oxygen environment (to thereby extend their shelf-life), support member 12 preferably allows less than or equal to about 1000 cc of oxygen to pass, more preferably less than about 500 cc of oxygen, more preferably still less than about 100 cc, even more preferably less than about 50 cc, and most preferably less than about 25 cc of oxygen to pass per square meter of material per 24 hour period at 1 atmosphere and at a temperature of 73° F. (at 0% relative humidity). Support member 12 may be formed from a material which itself provides a barrier to the passage of oxygen, e.g., vinylidene chloride copolymer, nylon, polyethylene terephthalate, ethylene/vinyl alcohol copolymer, etc. Alternatively, support member 12 may have a substantially gas-impermeable sealant film laminated or otherwise bonded to the inner (upper) surface thereof as disclosed in U.S. Pat. Nos. 4,847,148 and 4,935,089, and in U.S. Ser. No. 08/326,176, filed Oct. 19, 1994 and entitled "Film/Substrate Composite Material" (published as EP 0 707 955 A1 on Apr. 24, 1996), the disclosures of which are hereby incorporated herein by reference. As used herein, the phrase "sealant film" refers to a film which is conformably bonded to at least one of the exterior surfaces of the product support member. Preferably, the sealant film is bonded to the upper, as opposed to the lower, exterior surface of the support member and is a substantially gas-impermeable film. The sealant film thus preferably includes an oxygen-barrier material such as e.g., vinylidene chloride copolymer (saran), nylon, polyethylene terephthalate, ethylene/vinyl alcohol copolymer, etc.

Although product 16 is illustrated as having a maximum height which is below the maximum height of support member 12, i.e., the level at which flange 22 is located, the invention is not limited to such "low profile" products. Rather, "high profile" products may also be packaged in accordance with the present invention, i.e., those having a maximum height which is above the level at which flange 22 is located so that the portion of the product which extends above the level of flange 22 will be in contact with lid 24. In addition, support member may, as stated above, be a substantially flat sheet, in which case product 16 would also be a "high profile" product. An example of this latter packaging arrangement is a 'vacuum skin package' in which the product is packaged under vacuum and the space between the lid and support member containing the product is evacuated of gases so that the lid substantially completely conforms to the contour of the packaged product.

In one embodiment of the present invention, lid 24 can be completely removed from support member 12 by grasping tab 28 and peelably removing the entire lid, thereby providing direct access to product 16 in cavity 14. In this embodiment, heat-seal 30 is such that lid 24 is peelably sealed to flange 22. This embodiment is preferred when, for example, the packaged product is one which is intended to be delivered to the consumer in the same state in which it is originally packaged (as opposed to making a change in the packaging environment and, as a result, in the state of the packaged product, prior to presenting the package to the consumer as will be described below). Non-limiting examples of such packaging applications include non-delaminatable vacuum skin packaging; meat, poultry, or other food products which are packaged in a high-oxygen-content atmosphere, e.g., greater than 50% oxygen by volume (such packaged products, in general, have a shorter shelf-life than those which are packaged in a low-oxygen-content atmosphere as described below); precooked meals ("home meal replacement") where the lid is removed and the product is microwaved or heated in an oven either in the packaging tray or in a separate microwavable/ovenable container; and products that are packaged in a preservation-enhancing environment and can be eaten directly from the container without further preparation once the lid is removed such as fresh fruit, produce, and cheese.

In a second embodiment of the invention, lid 24 comprises a multilayer film capable of delamination into a gas-permeable portion and a substantially gas-impermeable portion. Preferably, lid 24 is heat-sealed to flange 22 of support member 12 at the gas-permeable portion so that delamination of the lid results in the removal of the gas-impermeable portion from the support member. It is also preferred that the force required to delaminate lid 24 is less than the force required to completely remove the lid from support member 12 (which, of course, is not the case with the embodiment discussed immediately above wherein tab 28 facilitates the complete removal of lid 24 from the support member). As will be discussed in more detail below, the present embodiment is useful, e.g., when it is desired to package, ship, and store product 16 in one atmospheric state and then display it for consumer purchase in another atmospheric state while the product remains enclosed in the same package.

Figure 2:
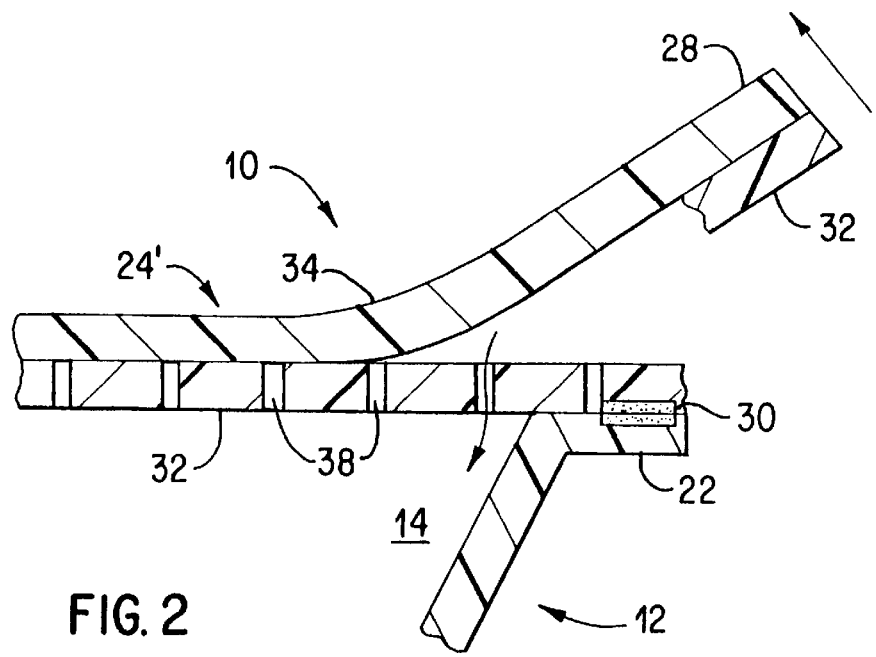
FIG. 2 is a schematic, partial cross-sectional view of one embodiment of the package shown in FIG. 1.

Referring now to FIG. 2, a package in accordance with the aforementioned second embodiment will be described. FIG.

2 is a partial cross-section of the package 10 of FIG. 1, wherein lid 24' comprises a gas-permeable film 32 in contact with and bonded to flange 22 of support member 12, and a substantially gas-impermeable film 34 peelably bonded to gas-permeable film 32. At least one of the permeable and impermeable films 32 and 34 comprises a reactively-modified surface in contact with the other film such that lid 24' peelably delaminates at a peel force ranging from about 0.001 pounds per inch to about 2.5 pounds per inch. As shown, gas-impermeable film 34 is peeled from permeable film 32 by grasping tab 28 and pulling in the general direction of the arrow. Heat-seal 30 has sufficient strength to maintain a bond between film 32 and flange 22 during the peeling process, so that film 32 tears upwards at heat-seal 30 until the interface of films 32 and 34 is reached, at which point the peel force propagates along such interface so that film 34 is peelably separated from film 32.

Lid 24' is preferably a laminate of films 32 and 34. Gas-permeable film 32 preferably includes perforations 36 therein. It is preferred that film 32 is a gas-permeable film because, although the perforations defined therethrough greatly increase the gas transmission rate of the film, the inherent permeability of the film itself aids in gas exchange and facilitates blooming of meat in areas of intimate film-to-meat contact (an impermeable film hinders meat-bloom in areas of intimate film-to-meat contact). However, a nonpermeable film which is perforated to render it permeable is also within the scope of the present invention. As is shown in FIG. 2, gas-impermeable film 34 is peeled away to reveal perforated film 32 for a rapid exchange of gases into and out of package 10. In the case where the packaged product is a fresh red meat product initially packaged in a low-oxygen gas, the peeling and removal of gas-impermeable film 34 allows the low-oxygen gas to escape and atmospheric oxygen to enter the package via perforations 36 (and film 32 itself if inherently gas-permeable), thereby causing the fresh red meat product to bloom, preferably at retail.

Perforations 36 preferably range from about 5 to about 250 microns in diameter, more preferably 25 to 125 microns, and most preferably 75 to 100 microns in diameter. Ideally, the perforations are large enough to permit the passage of atmospheric gas therethrough (oxygen, nitrogen, carbon dioxide), but small enough to prevent the passage of liquids or dirt. The perforations may be formed by any suitable means, including the use of mechanical, chemical, or electrical devices. Non-limiting examples of such devices include those which perforate with laser energy, electrostatic discharge, ultrasonic waves, flame discharge, needles or other sharp objects, or combinations thereof.

It is preferred that lid 24' is formed by reactive surface modification of films 32 and/or 34. More preferably, lid 24' is formed by corona lamination. Specifically, when gas-permeable film 32 includes perforations 36, corona lamination (or other form of reactive surface modification) is preferred to either adhesive lamination, wherein the adhesive may occlude the perforations. Most preferably, lamination is accomplished by corona treatment of one or both bonding surfaces of films 32 and 34, followed by joining the films at their bonding surfaces and then applying heat and pressure (e.g., via heated rollers) to the films to thereby complete the bond between the two films.

The amount of corona discharge to which the films are exposed is directly proportional to the amount of power supplied to the corona unit and also the speed at which the films are passed through the unit. Any desired combination of power input to the corona unit and film speed may be employed to achieve a desired bond-strength between the films, with bond-strength increasing with increased amounts of corona exposure. The amount of power supplied to the corona unit may range, e.g., from about 0.02 to about 0.5 kilowatts (kw) per inch of film width, and the film speed through the corona unit may range, e.g., from about 10 to about 2000 feet/minute. Corona treatment units are commercially available, e.g., from Enercon Industries Corporation of Menomonee Falls, Wis.

Corona lamination may be employed to form a laminate which is delaminatable at any desired peel force, depending on the component resins of the adjacent bonding layers of the films being laminated and the degree of corona discharge exposure (which is, in turn, determined by the amount of power supplied to the corona unit and the speed at which the film being treated passes through the corona unit). For purposes of the present invention, in order to ensure that film 34 may be peelably removed from film 32, the bond strength between the two films should be such that a peel force of no more than about 2.5 lb/inch is required to delaminate the two films. In fact, a weak bond, such as one representing a peel force as low as about 0.001 lb/inch, is sufficient to keep the films together during the manufacture, shipment, and storage of the package. A bond strength falling within these ranges provides a balance between sufficient adhesion to prevent premature separation of film 34 from film 32, e.g. during manufacture, shipping and storage, and sufficient peelability so that film 34 can be separated from film 32 without tearing or otherwise compromising film 32. A bond strength of more than 2.5 lb/inch results in a lid that is more difficult to peel, or can result in unintentional separation of the entire laminate from the tray. On the other hand, a bond strength of less than about 0.001 lb/inch creates a greater likelihood of premature separation of film 34 from film 32.

Further details concerning the foregoing package are described in U.S. Ser. No. 08/755,991, entitled "PACKAGE HAVING A MULTIPLE-FILM LID COMPRISING A GAS-IMPERMEABLE FILM PEELABLY ADHERED TO A GAS-PERMEABLE FILM," filed Nov. 25, 1996, the disclosure of which is hereby incorporated herein by reference thereto.

Figure 3:
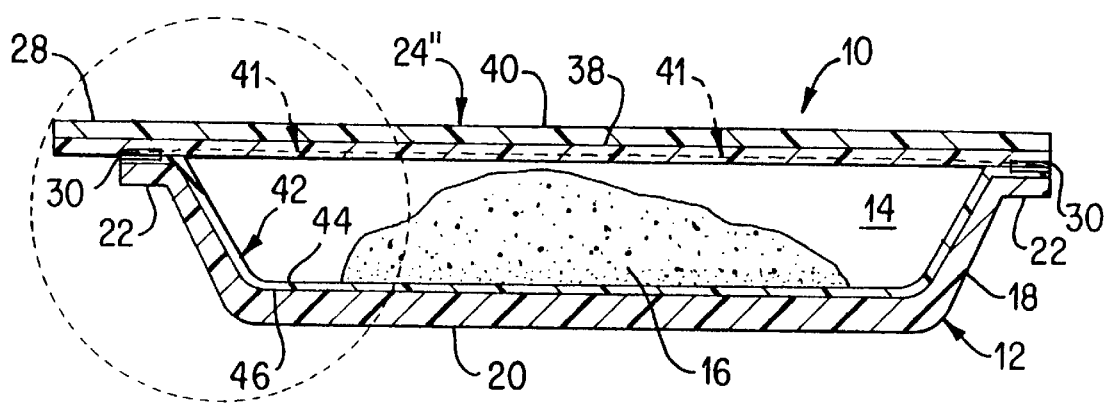
FIG. 3 is a schematic, cross-sectional view of another embodiment of the package shown in FIG. 1.
Figure 4:
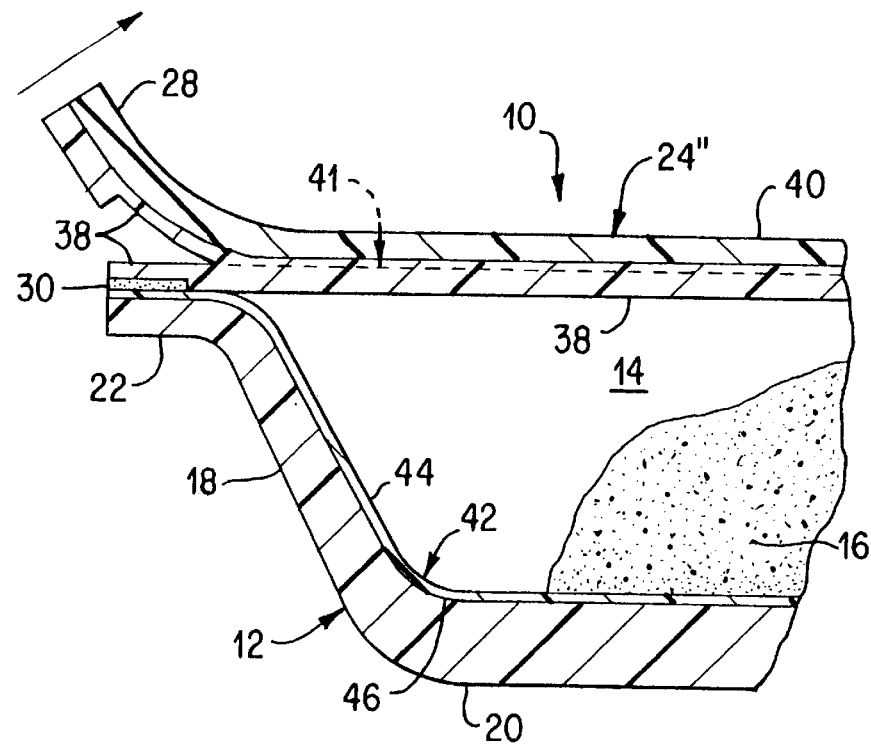
FIG. 4 is an enlarged cross-sectional view of a portion of the package illustrated in FIG. 3, wherein peelable delamination of the lid within the coextruded, multilayer film has been initiated.
Figure 5:
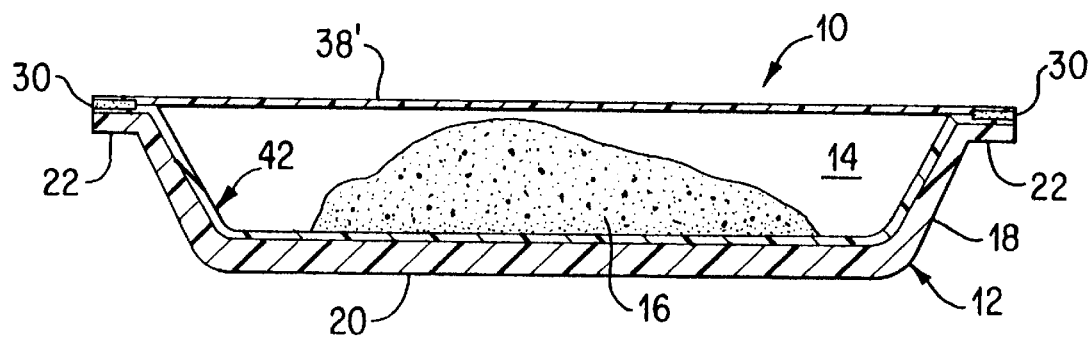
FIG. 5 is a schematic, cross-sectional view the package of FIGS. 3 and 4 wherein the lid has been peelably delaminated such that only a portion of the coextruded, multilayer film remains lidded to the product support member.

Referring now to FIGS. 3–5, an alternative package in accordance with the aforementioned second embodiment of the present invention will be described. FIG. 3 is a schematic, cross-sectional view of package 10, wherein lid 24" comprises a laminate comprising two or more films, at least one of the films being a coextruded, multilayer film, wherein the laminate delaminates within the coextruded, multilayer film when lid 24" is subjected to a peel force ranging from 0.001 to 2.5 pounds per inch. Preferably, lid 24" delaminates into a substantially gas-impermeable portion and a gas-permeable portion.

More specifically, the laminate from which lid 24" is constructed includes two or more films, at least one of the films being a coextruded, multilayer film 38. When the laminate is subjected to a peel force ranging from 0.001 to 2.5 pounds per inch, lid 24" delaminates within coextruded, multilayer film 38. Other films may be included in the laminate as necessary or desired, preferably including a substantially gas-impermeable film 40 comprising an oxygen-barrier material such as, e.g., vinylidene chloride copolymer, polyamide, polyethylene terephthalate, ethylene/vinyl alcohol copolymer, etc. Films 38 and 40 may be bonded by any suitable technique, such as, e.g., adhesive bonding, reactive surface modification, heat treatment, pressure treatment, etc., including combinations thereof. A preferred lamination technique is reactive surface modification and, more preferably, corona treatment combined with pressure and, optionally, heat immediately after corona treatment.

When lid 24" is grasped by, e.g., a retail worker at tab 28 and pulled generally upwards and backwards (i.e., towards an opposite edge or corner of the package), lid 24" delaminates within coextruded, multilayer film 38 as represented by the dashed line 41. Coextruded, multilayer film 38 is preferably a gas-permeable film and/or is perforated to allow atmospheric oxygen to pass therethrough (the same considerations of inherent permeability of the film and perforation size and methods apply to multilayer film 38 as discussed above in relation to gas-permeable film 32). Thus, by delaminating lid 24" within coextruded, multilayer film 38, not only is gas-impermeable film 40 removed from package 10 to thereby allow atmospheric oxygen to enter the package through the remainder of multilayer film 38 (thus allowing a packaged oxygen-sensitive product to be changed in some desirable way, e.g., causing a packaged fresh red meat product to bloom to a bright red color), but the coextruded, multilayer film 38 is reduced in thickness by virtue of being delaminated, thereby increasing the oxygen permeability of that film to allow for more rapid ingress of oxygen into the cavity 14 of the package 10. In certain packaging applications, the increased oxygen permeability of film 38 resulting from its delamination will be sufficient to make unnecessary the perforation of that film.

As shown in FIG. 3, support member 12 preferably includes a sealant film 42 having an upper principal surface 44 and a lower principal surface 46. The lower surface 46 is bonded to cavity 14 and to the upper surface of flange 22. In this manner, the upper surface 44 of sealant film 42 defines the uppermost surface of support member 12 which is thereby in direct contact with product 16 in cavity 14 and in contact with coextruded, multilayer film 38 of lid 24" on the upper surface of flange 22. More specifically, coextruded, multilayer film 38 is actually bonded, via heat-seal 30, to the upper surface 44 of sealant film 42 at flange 22. Thus, it is preferred that sealant film 42 fully lines, i.e., is conformably bonded to, the entire upper surface of support member 12. If desired, a second sealant film may be bonded to the lower, i.e., outer, surface of support member 12. Although it is not required for support member 12 to include a sealant film, it is preferable to include such a sealant film as a liner for at least the upper surface of support member 12 as a means to improve the functional characteristics of the support member when such improvement is deemed necessary or desirable. For example, if the support member is constructed of a material which is not sufficiently gas-impermeable for the intended package application, a sealant film which provides the required degree of gas-impermeability may be employed. A sealant film may also be used to improve the bond-strength of the heat-seal 30, i.e., when the coextruded, multilayer film and support member are constructed of materials which are not readily capable of forming a sufficiently strong heat-seal, a sealant film may be used which both bonds well to the upper surface of the support member and also forms a strong heat-seal with the coextruded, multilayer film.

FIG. 4 illustrates in greater detail the manner in which lid 24" delaminates within coextruded, multilayer film 38 when lid 24" is subjected to a peeling force. Coextruded, multilayer film 38 preferably has an intra-film cohesive strength which is lower than: 1) the inter-film bond-strength between the component films of laminate 24" (i.e., between films 38 and 40); 2) the intra-film cohesive strengths of the other films in the laminate (i.e., film 40 as presently illustrated); and 3) the bond-strength of heat-seal 30. In this manner, the coextruded, multilayer film component of the laminate internally separates, i.e., delaminates, when the laminate is subjected to a peel force which exceeds the intra-film cohesive strength of the coextruded film. Such intra-film cohesive strength preferably ranges from 0.001 to 2.5 pounds per inch.

When a retail worker or other person grasps tab 28 of lid 24" and applies a peeling force thereto in the general direction of the arrow shown in FIG. 4, coextruded, multilayer film 38 begins to delaminate as the peeling force is directed upwards at heat-seal 30 and into plane 41 of relatively weak intra-film cohesive strength in film 38. Delamination plane 41 is preferably formed by the interface of two adjacent layers within multilayer film 38 which peelably separate from one another at a peel force ranging from 0.001 to 2.5 pounds per inch. The inter-layer adhesion between such adjacent layers preferably represents not only the weakest component of the intra-film cohesive strength of coextruded, multilayer film 38, but also the weakest cohesive or adhesive bond within the lid 24". In this fashion, when lid 24" is subjected to a peel force ranging from 0.001 to 2.5 pounds per inch, delamination occurs at plane 41. Peelable separation in this manner may be achieved by constructing coextruded, multilayer film 38 such that one of the adjacent layers at plane 41 comprises a non-polar material while the other adjacent layer comprises a polar material. For example, one of the adjacent layers may comprise non-polar polyethylene homopolymer or copolymer while the other adjacent layer comprises at least one material selected from the group consisting of polyamide, copolyamide, polyester, copolyester such as polyethylene terephthalate, polar polyethylene copolymers such as ethylene/vinyl alcohol, polycarbonate, polymethylpentene, polyvinylidene chloride copolymer, polyurethane, polybutylene homopolymer and copolymer, and polysulfone. Alternatively, one of the adjacent layers at plane 41 may comprise polyethylene homopolymer or copolymer while the other adjacent layer comprises polypropylene homopolymer or copolymer.

As an alternative to providing for inter-layer adhesive separation as a means of achieving delamination within coextruded, multilayer film 38 at plane 41, the coextruded, multilayer film may comprise at least one layer which internally separates when the lid is subjected to a peel force ranging from 0.001 to 2.5 pounds per inch. A combination of inter-layer adhesive failure and intra-layer cohesive failure within coextruded, multilayer film 38 may also be employed, if desired, as a means of achieving preferential delamination of such film. This can occur, e.g., when the primary plane of delamination is between two adjacent film layers but the delamination path "wanders" into one or both of the adjacent film layers.

Preferably, at least one of films 38 and 40 is oriented, more preferably biaxially-oriented, so that lid 24" is at least partially heat-shrinkable. In this manner, the first peripheral portion 26 thereof will heat-contract toward heat-seal 30 upon the application of heat.

Gas-impermeable film 40 and sealant film 42 preferably comprise a material which provides a substantial barrier to the passage of gas, particularly oxygen, therethrough. Suitable materials include, e.g., vinylidene chloride copolymer (saran), nylon, polyethylene terephthalate, ethylene/vinyl alcohol copolymer, silicon oxides (SiOx), etc.

Each of films 38, 40, and 42 may have any desired thickness, ranging, e.g., from about 0.3 mils to about 12 mils. Preferably, the films range in thickness from about 0.5 mils to about 8 mils; more preferably from about 0.75 mils to about 5 mils; most preferably from about 1 to about 3 mils.

Preferably, coextruded, multilayer film 38 is perforated. The perforations are preferably formed in coextruded, multilayer film 38 prior to bonding film 38 to gas-impermeable film 40. The perforations preferably extend completely through multilayer film 38 to form a passageway therethrough which extends from one major surface of the film to the other major surface. When the film is delaminated along plane 41, each of the perforations is separated into two portions. One portion is removed from support member along with gas-impermeable film 40, while the other portion remains with package 10 along with the remaining part multilayer film 38 after lid 24" has been delaminated. Delamination thereby exposes the perforations to the atmosphere so that atmospheric oxygen can enter the package therethrough.

The end result of the delamination process is shown in FIG. 5, wherein gas-impermeable film 40 and a portion of coextruded, multilayer film 38 have been removed from package 10 such that only gas-permeable portion 38' of lid 24" remains attached to support member 12. In this manner, product 16 remains fully enclosed within package 10, i.e., gas-permeable portion 38' is still heat-welded to flange 22 of support member 12 via heat-seal 30 and continues to protect the product from microbial and other contaminates. However, atmospheric oxygen can now enter the cavity 14 of package 10 through the now-exposed gas-permeable portion 38', which is gas-permeable by virtue of being formed from a film which is itself gas-permeable and/or having perforations therein. When multilayer film 38 is both inherently gas-permeable and perforated, atmospheric oxygen can enter into the package through the film as well as through the perforations. If product 16 is a fresh red meat product originally packaged in a gas which is lower in oxygen content than air, the increased rate of gas-transmission through gas-permeable portion 38' results in a faster exchange of atmospheric oxygen for the packaging gas, thereby leading to a more rapid blooming of the fresh red meat product. In this manner, package 10 as shown in FIG. 5 can more rapidly be displayed for consumer purchase, i.e., the delay time in waiting for the fresh red meat product to bloom to an acceptable color of red is reduced. This is an advantageous feature of the present embodiment of the invention.

Another advantage of the present invention, which can be seen with reference to FIGS. 1–5, is that the first peripheral portion 26 of lid 24" (or 24') can be heat-contracted towards heat-seal 30 to such an extent that very little or none of that first peripheral portion extends beyond the outer periphery of flange 22. In this manner, only tab 28 extends beyond flange 22 to any appreciable extent. When lid 24" is caused to be peelably delaminated, tab 28 is completely removed from the package so that, when the package is displayed for customer purchase, substantially the entire periphery of the remaining lid 38' is coextensive from heat-seal 30 and, if sufficiently heat-contracted, is within the periphery of flange 22. In this manner, a neat-looking, aesthetically appealing package is presented to the customer, i.e., one without peripheral portions of the remaining lid 38' extending beyond the periphery of flange 22.

Further details concerning the embodiment of the invention described immediately above and shown in FIGS. 3–5 are disclosed in copending patent application Ser. No. 08/764,405, entitled "LAMINATE HAVING A COEXTRUDED, MULTILAYER FILM WHICH DELAMINATES AND PACKAGE MADE THEREFROM" and filed Dec. 11, 1996, the disclosure of which is hereby incorporated herein by reference thereto.

Figure 6:
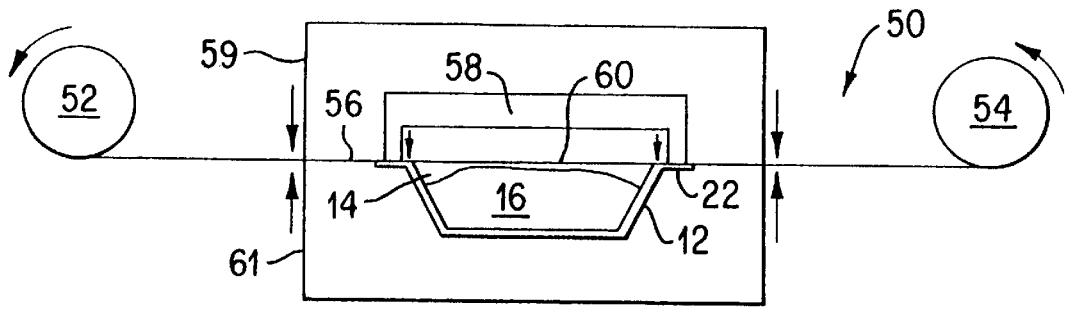
FIG. 6 is a schematic illustration of a packaging apparatus for producing a package in accordance with the present invention, wherein a securing device 58 is forming a heat-seal between a web 56 and the flange 22 of tray 12 in an enclosure formed by upper and lower vacuum chamber portions 59 and 61, respectively.
Figure 7:
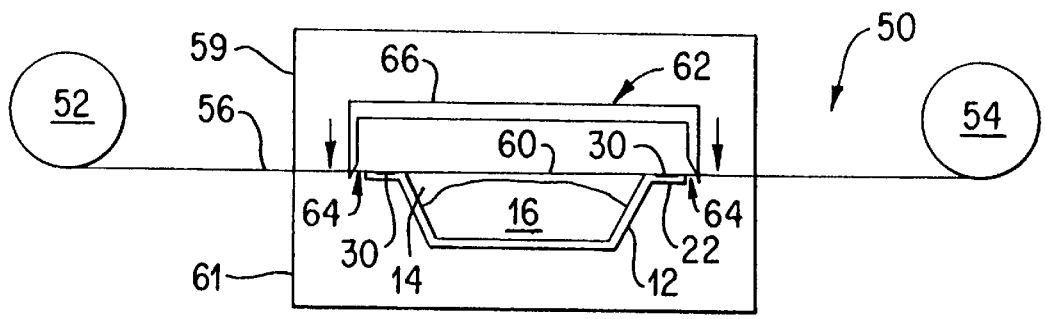
FIG. 7 is similar to FIG. 6, except that cutting element 66 is severing a segment 64 of web 56.
Figure 8:
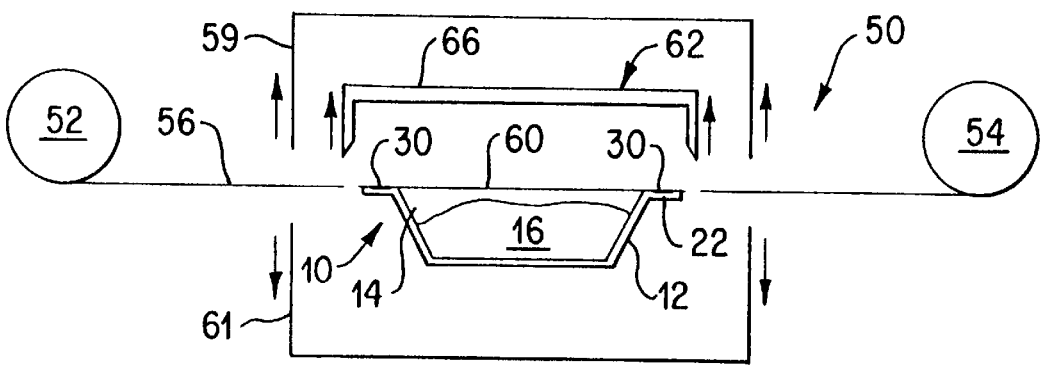
FIG. 8 is similar to FIG. 7, except that securing device 58 and upper and lower vacuum chamber portions 59 and 61 have retracted to their respective starting positions so that finished package 10 can be removed from the packaging apparatus.

Having now described a preferred package in accordance with the present invention, a preferred method and apparatus for making such package will be discussed. Referring generally to FIGS. 6–8, packaging apparatus 50 includes a mechanism for positioning a web of film 56 over support member 12 having product 16 disposed therein. As illustrated, the positioning mechanism includes a pair of rolls 52 and 54 which unwind and take-up, respectively, web 56 and position the web over support member 12 so that a lid can be severed from the web and heat-sealed to the support member. The material from which web 56 is formed is preferably a flexible, polymeric film which is at least partially heat-shrinkable as described above in connection with lid 24 (lid 24 is formed from web 56).

Referring specifically to FIG. 6, apparatus 50 further includes a device 58 for securing a portion 60 of web 56 to the flange 22 of support member 12 by forming a heat-seal (i.e., heat-seal 30 as described above) between the support member and web. The heat-seal formed by securing device 58 extends substantially continuously about the upper surface of flange 22 to enclose product 16 between support member 12 and the secured portion 60 of web 56. Securing device 58 applies heat and pressure to web 56 at flange 22 in the direction of the arrows shown in FIG. 6 to thereby effect a heat-seal between the web and flange. The amount of heat and pressure which are necessary to effect the heat-seal are dependent upon a number of factors, e.g., the thickness and composition of web 56, and can readily be determined by one having ordinary skill in the art to which this invention pertains. Securing device 58 preferably has a heated metal surface to contact web 56. Preferably, the heated metal surface essentially mirrors the shape of, but has a slightly narrower width than, flange 22.

It is preferred that, prior to securing web 56 to flange 22, cavity 14 is at least partially evacuated of air and then at least partially filled with a desired packaging gas, e.g., one which is lower in oxygen content than air. This may be accomplished by carrying out the securing step shown in FIG. 6 in a substantially air-tight enclosure which can be evacuated and/or back-flushed with a desired packaging gas. Such air-tight enclosure may be formed from upper and lower vacuum chamber portions 59 and 61, at least one of which is movable in the direction of the arrows so that the chamber portions can be joined to enclose the entire packaging apparatus 50 (or only a portion thereof excluding rolls 52 and 54 as shown). The resultant enclosure is then evacuated to a desired degree and, if desired, filled ("back-flushed") with a preservation-enhancing packaging gas. Portion 60 of web 56 is then secured to support member 12 so that cavity 14 will contain therein the preservation-enhancing packaging gas (along with product 16). In this manner, food product 16 can be shipped and stored in an atmosphere which is ideally suited to maximize the shelf-life of that particular product. Movable vacuum chamber portions and associated evacuation/back-flushing apparatus (not shown) are well known in the art.

Any desired amount of air may be removed from the enclosure formed by chamber portions 59 and 61 during the evacuation step, e.g., ranging from 1% to 99.999% by volume. In the case where a fresh red meat product is to be packaged, the amount of air removed preferably ranges from about 99% to about 99.999%, and more preferably from about 99.5% to about 99.999% by volume. Preferred gases to replace the evacuated air include, e.g., carbon dioxide, nitrogen, argon, etc., and mixtures of such gases. As a result of these steps, the cavity 14 of package 10 will preferably contain, prior to peeling lid 24, less than 1% oxygen by volume, more preferably less than 0.5% oxygen, even more preferably less than 0.1% oxygen, and most preferably, less than 0.05% oxygen by volume, with the balance comprising a gas or mixture of gases, such as a mixture of carbon dioxide and nitrogen. When package 10 provides a substantially gas-impermeable enclosure, such a modified-atmosphere packaging environment ensures that a packaged fresh red meat product will have a shelf-life of at least seven days, more preferably at least ten days, even more preferably at least fourteen days and, most preferably, at least twenty one days (assuming, of course, that the package is maintained under refrigerated conditions, e.g., at temperatures ranging from about 28° F. to about 48° F., and not exposed to light for any appreciable amount of time).

Referring now to FIG. 7, packaging apparatus 50 further includes an apparatus 62 for severing a segment 64 of web 56 in a substantially closed geometrical shape that encompasses the secured portion 60 of the web. Severing apparatus 62 includes a cutting element 66 which is configured in the substantially closed geometrical shape. Cutting element 66 is also configured to produce the peel-initiation tab 28 of the final package 10 as illustrated, e.g., in FIG. 1 (cutting element 66 is further illustrated in FIGS. 9–11 and described in further detail below).

As illustrated sequentially in FIGS. 6–8, a preferred packaging method is as follows. After product 16 has been loaded into support member 12, rolls 52 and 54 position web 56 over support member 12 as shown in FIG. 6. Upper and lower vacuum chamber portions 59 and 61 then converge on opposite surfaces of web 56 to form a substantially air-tight enclosure, which enclosure is then evacuated and then back-flushed with a desired packaging gas. Securing device 58 then secures portion 60 of web 56 to flange 22 of support member 12. This is shown in FIG. 6 wherein securing device 58, which is reciprocatable toward and away from web 56, translates towards the web and is pressed into contact with the upper surface of the web over flange 22 to thereby heat-seal the web to flange 22. In so doing, product 16 is enclosed between support member 12 and the secured portion 60 of web 56.

The next step in the preferred method is shown in FIG. 7, wherein after securing device 58 has formed heat-seal 30, cutting element 66, which is also reciprocatable toward and away from web 56, translates towards the web and severs segment 64 therefrom in a closed geometrical shape that encompasses the secured portion 60. Any desired geometrical shape is possible, but is preferably one which follows, but is slightly outside of, the periphery of flange 22 so that the shape of the severed web segment 64 is similar to but slightly larger than the shape defined by the periphery of flange 22. As will be explained in greater detail below, cutting element 66 is preferably heated to both facilitate the severing of the web and to cause a majority of the periphery of the severed web segment 64 to heat-shrink toward heat-seal 30, thereby producing a neat, aesthetically-appealing package.

The finished package 10 is shown in FIG. 8, wherein upper and lower vacuum chamber portions 59, 61 and cutting element 66 have disengaged from web 56 by reciprocating away from the web as shown. The severed and heat-contracted web segment 64 (encompassing secured portion 60) becomes the lid (i.e., lid 24) for the package. Package 10 is then moved from packaging apparatus 50 either manually or automatically (e.g., via a conveyor belt).

The aforementioned packaging method in accordance with the present invention is preferably a continuous process, with one product-containing support member after another having a peelable lid applied thereto in the manner described above. The process may also be performed in parallel, with two or more packages being produced simultaneously. In a continuous process, rolls 52 and 54 intermittently unwind and take-up, respectively, web 56 between each lidding cycle as described above to continuously present a new section of web from which a portion may be secured and severed. Preferably, web segment 64 is severed from web 56 in such a manner that the web remains sufficiently intact to allow take-up roll 54 to advance the web from unwind roll 52. This may be accomplished by severing web segments 64 from the interior of the web so that the edges thereof remain intact.

The aforedescribed packaging method can be performed on currently available modified-atmosphere packaging machinery commercially supplied by, e.g., Ross Industries, Inc. or Multivac, Inc. Specific examples of suitable models include the Ross Inpack® 3320 or the Multivac® T500. While such packaging machinery is capable of performing the basic packaging functions as described above, such machinery has heretofore been incapable of providing a package having a peel tab in accordance with the present invention. As described below in connection with FIGS. 9–11, by using a cutting element 66 in accordance with the present invention, it is possible to provide a peel tab in a package having a peelable lid through the use of conventional packaging machinery but without additional processing steps, material, or cost.

Figure 9:
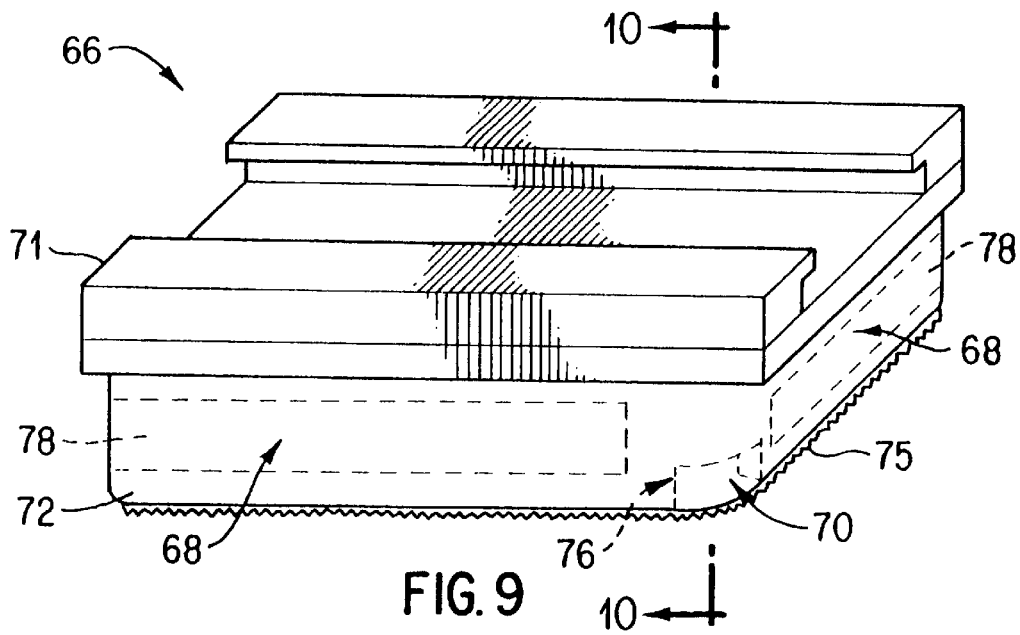
FIG. 9 is a perspective view of a preferred cutting element in accordance with the present invention.
Figure 10:
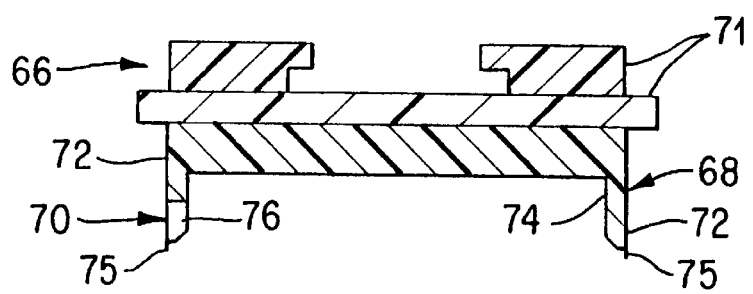
FIG. 10 is a cross-sectional view of FIG. 9 taken along section line A—A.
Figure 11:
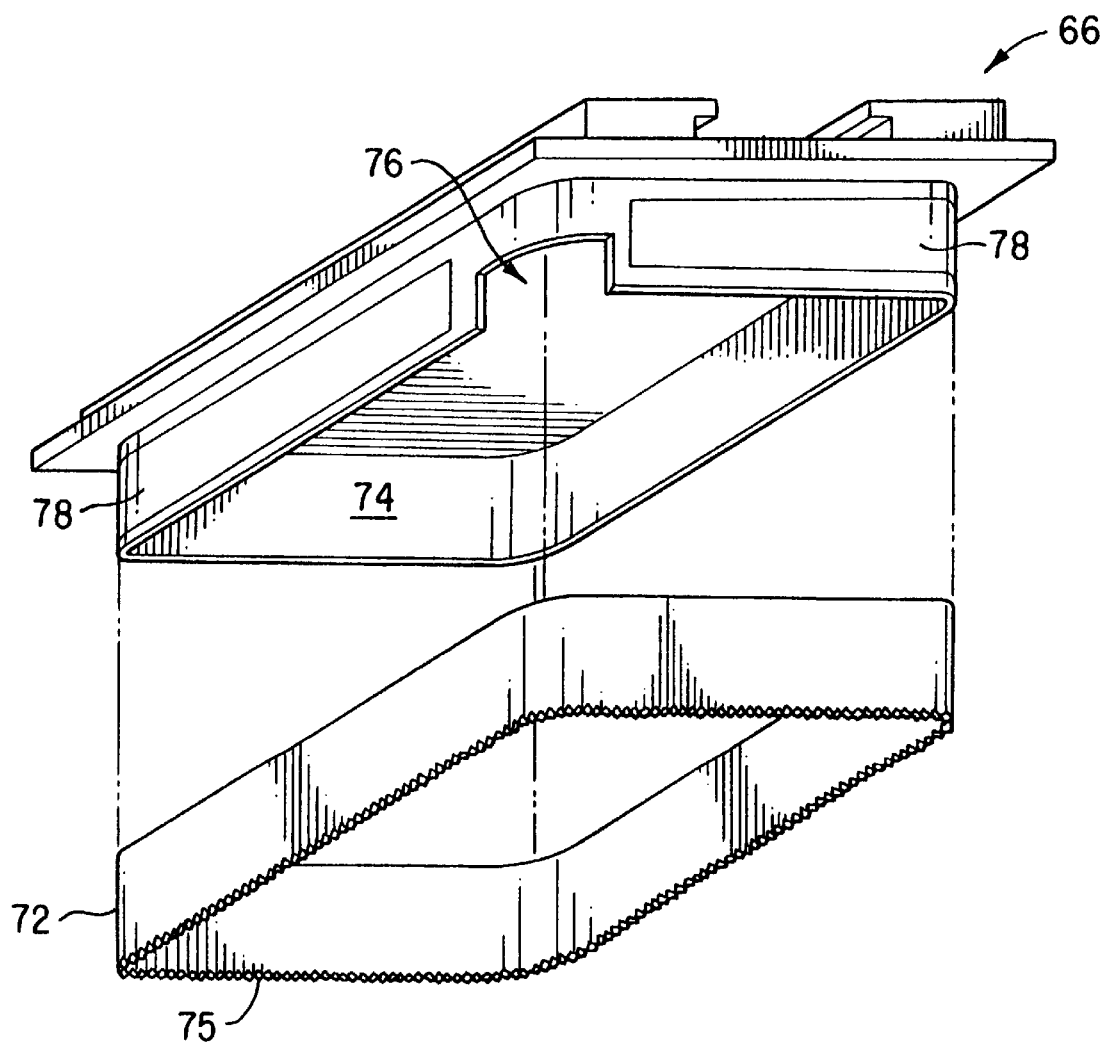
FIG. 11 is an exploded perspective view of the cutting element shown in FIGS. 9–10 but taken from a perspective which is beneath the cutting element.

Referring now to FIGS. 9–11, a preferred means for creating tab 28 will be explained. Cutting element 66 of severing apparatus 62 preferably has a heated portion 68 and a relatively cooler portion 70. In this manner, a first peripheral portion of the severed web segment 64 (corresponding to first peripheral portion 26 of lid 24 in FIG. 1) adjacent the heated portion 68 of cutting element 66 is heat-contracted toward the heat-seal (i.e., heat-seal 30) to a greater degree relative to a second peripheral portion of the severed web segment (corresponding to second peripheral portion or tab 28 of lid 24 in FIG. 1) adjacent the relatively cooler portion 70 of the cutting element. Thus, the second peripheral portion extends outwardly of the heat-seal to a greater degree than the first peripheral portion to provide a tab which can be manually grasped as explained above in connection with FIG. 1.

A preferred cutting element having both a heated and a relatively cooler portion includes a blade 72 configured in a substantially closed geometrical shape as shown, and a heating unit 74 for heating a portion of blade 72. Mounting bracket 71 secures the cutting element 66 to the rest of the severing apparatus 62, which apparatus includes a mechanism (not shown) to reciprocate the cutting element toward and away from web 56. As shown, blade 72 is substantially rectangular in shape with rounded corners (to roughly match the periphery of flange 22), and preferably contains a serrated bottom edge 75 which makes initial contact with web 56. The serrations serve to facilitate the severing process. Blade 72 is attached to and outboard of heating unit 74. In this manner, heat from heating unit 74 is transferred directly to the first peripheral portion of the severed web segment 64 and, on the other side of the heating unit, to blade 72. The heat which is transferred to blade 72 facilitates the severing of the web while the heat transferred to the first peripheral portion of the severed web segment facilitates the heat-shrinkage thereof. To be sure, the heated blade 72 contributes somewhat to the heat-shrinkage of the periphery of the severed web segment 64. However, the majority of heat-shrinkage has been found to occur as a result of contact of the heating unit 74 with the periphery of the severed web segment.

A preferred means for providing cutting element 66 with a heated portion 68 and a relatively cooler portion 70 is to provide a notched section 76 in heating unit 74. The notched section, which results in cooler portion 70 of cutting element 66, has two primary effects. First, no contact between the periphery of severed web segment 64 and heating unit 74 occurs adjacent the notched section 76 so that heating unit 74 contributes little, if any, heat-shrinkage to the severed web segment at the portion thereof adjacent notched section 76. Secondly, less heat is transferred to blade 72 adjacent the notched section so that less heat-shrinkage is contributed by the blade to the severed web segment in the vicinity of the notched section. As a result, the periphery of severed web segment 64 adjacent the notched section 76 is less heat-contracted toward the heat-seal (30) than the remaining peripheral portion of the severed segment, thereby resulting in tab 28. Notched section 76 is preferably located on one of the corners of the heating unit so that tab 28 will appear on a corner of package 10.

Heating unit 74 can be heated by any conventional means, e.g., via an electric current which flows through the unit and is dissipated as heat; steam, heated water, or heated air which flows through the interior of the unit; a heated wire, a heated strip, non-contact radiative heating, or other means for externally heating the element; etc. A preferred heating mechanism is a flexible heating strip 78 which is attached to the interior or exterior, but preferably the exterior, surface of heating unit 74 as shown in FIG. 11. In this manner, heating strip 78 is disposed between heating unit 74 and blade 72. The heating strip may, but preferably does not, extend over notch 76. In general, heating strips convert electrical energy to heat energy, and the temperature thereof may be easily controlled by regulating the amount of electric current which is supplied to the heating strip. A preferred type of heating strip is a silicone-rubber flexible heater with etched foil elements. This, as well as other, type of heating strip is well known and is commercially available from a number of sources.

In general, heating element 66 can be maintained at any desired temperature to achieve a desired rate of severing and a desired degree of heat-shrinkage of the severed web segment. With regard to the multilayer films discussed above, the heated portion 68 of cutting element 66 is preferably maintained at a temperature ranging from about 100 to about 400° F., more preferably from about 150 to about 300° F., and most preferably from about 180 to about 250° F. Temperatures in excess of 400° F. are likely to result in excessive heat-shrinkage while temperatures below 100° F. may result in insufficient heat-shrinkage and incomplete or an unacceptably slow rate of web severance. The relatively cooler portion 70 of cutting element 66 may be also be maintained at any desired temperature, provided that the part of blade 72 at cooler portion 70 is sufficiently hot to sever to the web but not so hot that the second peripheral portion 28 of the resultant lid heat-shrinks toward the heat-seal to the same degree as the first peripheral portion 26. The temperature difference between heated portion 68 and cooler portion 70 may range, e.g., from about 10° F. to about 150° F., but preferably ranges from about 20° F. to about 60° F. and, more preferably, from about 30° F. to about 60° F.

Advantageously, the severing apparatus and cutting element (62 and 66) as described immediately above can be used with currently-available packaging machinery (e.g., the Ross Inpack® 3320 or the Multivac® T500 machines as noted above) to produce a package 10 in accordance with the present invention. This can be accomplished by supplanting the cutting device found in such packaging machinery with a cutting element in accordance with the present invention (e.g., cutting element 66).

What is claimed is:

1. A packaging method, comprising:
   a. positioning a web of film over a support member having a product thereon, said film being at least partially heat-shrinkable;
   b. securing a portion of said web to said support member by forming a heat-seal between said support member and said web, said heat-seal extending substantially continuously about the product to enclose the product between said support member and the secured portion of said web; and
   c. severing a segment of said web in a substantially closed geometrical shape that encompasses the secured portion of said web with a cutting element having a heated portion and a relatively cooler portion so that a first peripheral portion of the severed web segment adjacent the heated portion of said cutting element is heat-contracted toward said heat-seal to a greater degree relative to a second peripheral portion of the severed web segment adjacent the relatively cooler portion of said cutting element, whereby said second peripheral portion provides a tab which can be manually grasped.

2. The method of claim 1, wherein said web is peelably sealed to said support member at said heat-seal.

3. The method of claim 1, wherein said web comprises a multilayer film capable of delamination into a gas-permeable portion and a substantially gas-impermeable portion.

4. The method of claim 3, wherein said web is heat-sealed to said support member at said gas-permeable portion so that delamination of said web results in the removal of said gas-impermeable portion from said support member.

5. The method of claim 4, wherein the force required to delaminate said web is less than the force required to remove said web from said sealing surface.

6. The method of claim 1, wherein said web comprises a gas-permeable film in contact with said support member and a substantially gas-impermeable film bonded to said gas-permeable film, at least one of said permeable and impermeable films comprising a reactively-modified surface in contact with the other film such that said web peelably delaminates at a peel force ranging from 0.001 pounds per inch to 2.5 pounds per inch.

7. The method of claim 1 wherein said web comprises a laminate comprising two or more films, at least one of said films being a coextruded, multilayer film, wherein said laminate delaminates within said coextruded, multilayer film when said laminate is subjected to a peel force ranging from 0.001 to 2.5 pounds per inch.

8. The method of claim 7, wherein said laminate delaminates into a substantially gas-impermeable portion and a gas-permeable portion.

9. The package of claim 8, wherein said coextruded, multilayer film is perforated.

10. The method of claim 1, wherein said support member includes a cavity in which the product is disposed and a peripheral flange extending outwardly from said cavity and having an upper surface, said web being bonded to said upper flange surface via said heat-seal, said heat-seal extending substantially continuously around said upper flange surface.

11. The method of claim 1, wherein said cutting element comprises:

a blade configured in said substantially closed geometrical shape; and a heating unit for heating a portion of said blade and for heating said first peripheral portion of the severed web segment.

12. The method of claim 1, wherein said heated portion of said cutting element is maintained at a temperature ranging from about 100 to about 400° F.

13. The method of claim 1, wherein said cooler portion of said cutting element is maintained at a temperature ranging from about 10 to about 150° F. less than the temperature at which said heated portion of said cutting element is maintained.

14. The method of claim 1, wherein said cutting element is reciprocated toward and away from said film.

15. The method of claim 1, further including the step of at least partially evacuating the product enclosure between said support member and said web.

16. The method of claim 15, further including the step of at least partially filling the product enclosure between said support member and said web with a gas which is lower in oxygen content than air.

* * * * *